United States Patent [19]
McGee et al.

[11] 3,811,709

[45] May 21, 1974

[54] FULL BORE CASING HEAD

[75] Inventors: John K. McGee; Marvin L. Holbert, Jr., both of Houston, Tex.

[73] Assignee: Gray Tool Company, Houston, Tex.

[22] Filed: Sept. 6, 1972

[21] Appl. No.: 286,755

[52] U.S. Cl.............. 285/39, 285/137 A, 285/141, 285/308
[51] Int. Cl............................................ F16l 35/00
[58] Field of Search ............ 285/39, 141, 308, 321, 285/DIG. 21, DIG. 13, 82, 314, 133 A, 137 A

[56] References Cited
UNITED STATES PATENTS

| 239,827 | 4/1881 | Newman | 285/321 X |
|---|---|---|---|
| 1,831,956 | 11/1931 | Harrington | 285/DIG. 13 |
| 2,084,431 | 6/1937 | Cotley | 285/321 X |
| 3,405,956 | 10/1968 | Pierce | 285/141 X |
| 3,661,409 | 5/1972 | Brown | 285/82 |

Primary Examiner—Dave W. Arola
Attorney, Agent, or Firm—Cushman, Darby & Cushman

[57] ABSTRACT

The casing head has a throughbore which is equivalent in diameter to that of the control equipment (e.g., blowout preventers) that are installed above the head. Expansible support ring means are installed in the head to hang casing. A drill bit of larger diameter than the internal diameter of the contracted ring may be pulled up through the ring should the operator have forgotten to expand it. Wash out ports are provided to prevent accumulation of foreign matter in the working space of the support ring. The invention is applicable to single, multi-bowl and compact head completions.

12 Claims, 7 Drawing Figures

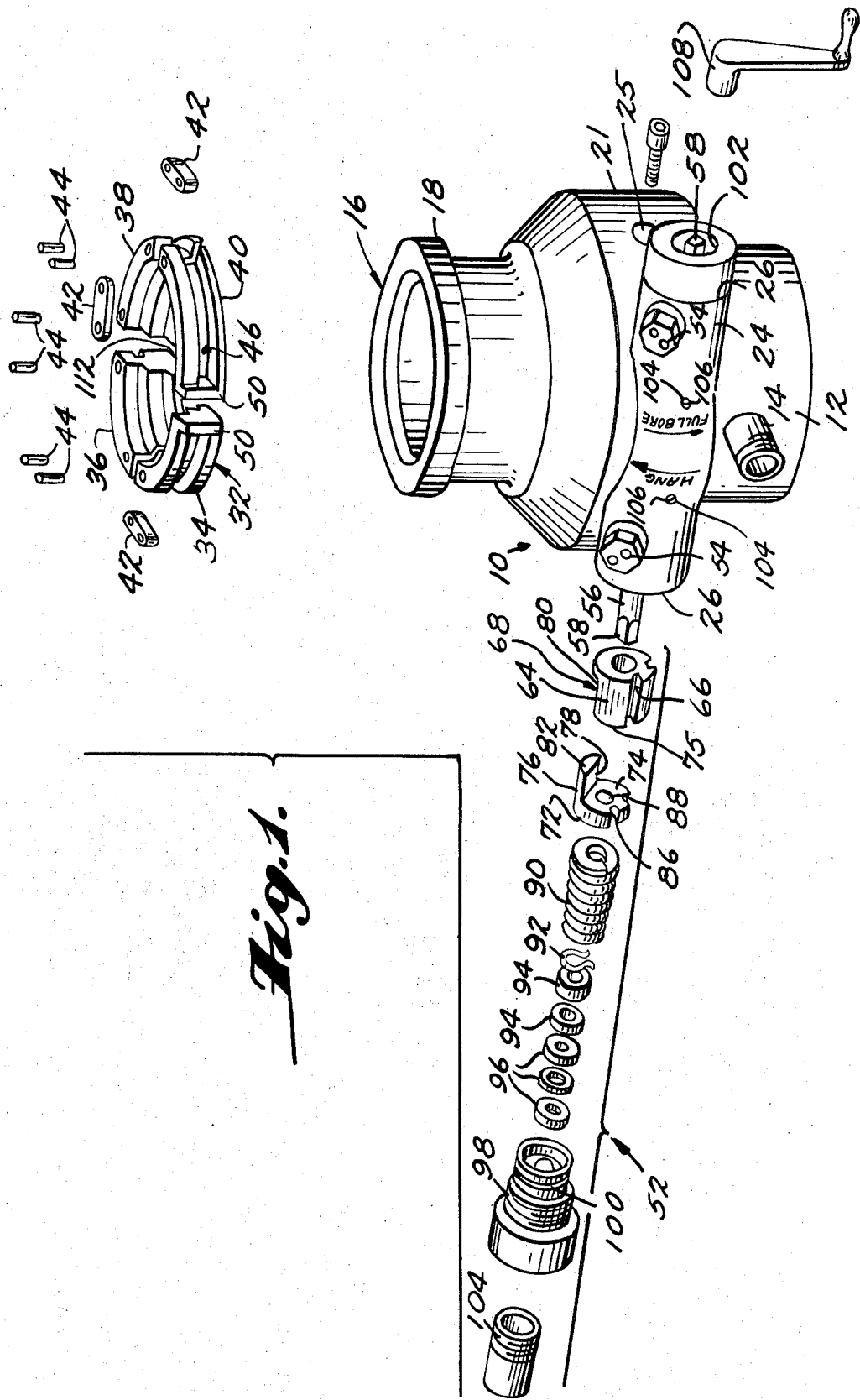

FULL BORE HEAD IN "HANG" POSITION

"FULL BORE" POSITION

TEMPORARY EXPANSION BY PULLING BIT THROUGH

FULL BORE CASING HEAD

BACKGROUND OF THE INVENTION

The U.S. patent of Pierce, Jr., 3,248,132, illustrates a full bore head wherein a plurality of angularly spaced, radially movable wedges at a level perform the dual roles of holding down a lower hanger or the like and supporting an upper hanger or the like. However, the wedges must be intentionally radially moved to permit passage of full bore equipment and do not automatically retract to pass such equipment. Furthermore, the space occupied by the wedges prevents use of this design of head in certain instances. For instance, it would be difficult and probably not possible to employ individual wedges as support means in the following situation: three wells are to be drilled within a 44 inch I.D. platform leg, the casing program being 16 inches × 10¾ inches × 7 inches; above the 16 inch casing, to utilize 13⅝ inch bore blowout preventers, and a 13⅝ inch casing head which will allow the use of a 13½ inch O.D. drill bit. The close spacing of the wellheads, drilling equipment and the resulting flow assemblies are the principal factors weighing against the use of individual wedges for hanger support in this completion.

The U.S. patent of Pierce, Jr., 3,405,956, issued Oct. 15, 1968, shows a casing head carrying an inherently expansible, cammed toward contraction locking ring having supporting surfaces, shown provided in plurality in a multi-bowl head and actuated by radially directed screws in side ports; the U.S. Pat. of Baugh et al. 3,592,489 issued July 13, 1971, shows (when one obtains the correct drawings thereof) a casing head provided with an inherently expansible, cammed toward contraction support ring actuated by a coaxial annular fluid-powered piston. An expansible/contractile clamp powered by a generally tangent turnbuckle-like device is shown in the U.S. Pat. of Brown et al., 3,661,409, issued May 9, 1972. A slip-type hanger operated by a worm gear/worm wheel is shown in the expired U.S. Pat. of Segelhorst, 1,637,055, issued July 26, 1927.

SUMMARY OF THE INVENTION

The invention provides a full bore casing head containing a segmented ring which may be moved between expanded and contracted conditions and which when contracted can be temporarily expanded against resilient contracting spring force by contact by a tool or drill bit being withdrawn from the well.

The casing head has a throughbore which is equivalent in diameter to that of the control equipment (e.g., blowout preventers) that are installed above the head. Expansible support ring means are installed in the head to hang casing. A drill bit of larger diameter than the internal diameter of the contracted ring may be pulled up through the ring should the operator have forgotten to expand it. Wash out ports are provided to prevent accumulation of foreign matter in the working space of the support ring. The invention is applicable to single completions and to multi-bowl and compact head completions.

The principles of the invention will be further hereinafter discussed with reference to the drawings wherein a preferred embodiment is shown. The specifics illustrated in the drawings are intended to exemplify, rather than limit, aspects of the invention as defined in the claims.

BRIEF DESCRIPTION OF THE DRAWINGS

In the drawings:

FIG. 1 is an exploded perspective view of a full bore casing head provided in accordance with the present invention;

DETAILED DESCRIPTION OF THE PRESENTLY PREFERRED EMBODIMENT OF THE INVENTION

Figure 2A:
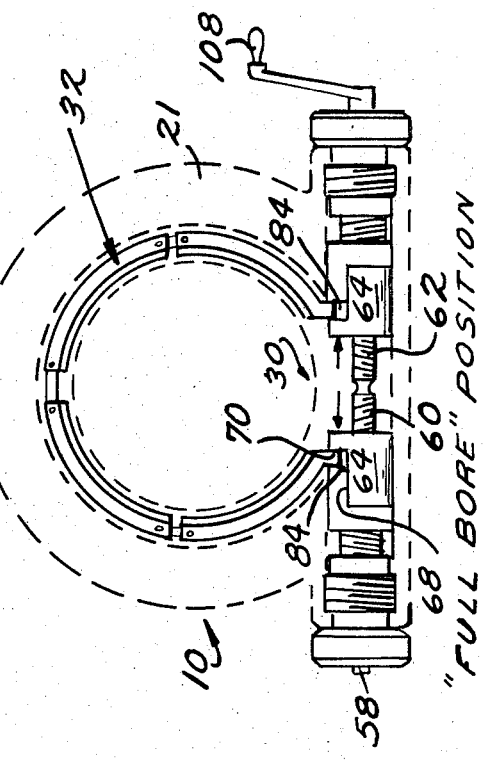
FIGS. 2A, 2B and 2C are schematic top plan views of the head of FIG. 1 showing the outlines of the head and bore in dashed lines and the support ring and its actuating means in full lines in three respective states of operation, as captioned.

FIG. 1 depicts a generally tubular casing head 10 adapted to be incorporated in a petroleum well during an initial stage of its completion, e.g., in this figure, the head 10 is shown circumferentially welded at its base onto the upper end of a casing string 12 provided with an outlet nipple 14 and is shown provided at its upper end with a hub 16 having a circumferentially extending, radially outwardly projecting flange 18 for clamping other equipment onto the casing head 10. Both depicted forms of securement to other equipment are exemplary of many others known in the art. Intermediate its ends, the head 10 is radially enlarged at 21 to provide for an internal, radially inwardly opening, circumferential groove (20, FIG. 5) in the throughbore 22 of the head.

The groove 20 is shown having a tapering lower surface 23 extending upwardly to the radially outer base of the groove and downwardly to its intersection, with the remainder of the throughbore 22 in the nature of a slip bowl. A plurality of ports with threadably removable plugs 25 are spaced about the band 21 and intersect with the base of the groove 20 to permit debris to be purged from the groove when necessary or as a precaution against malfunction of operation.

Upon its radially enlarged band 21, the head is provided with a tubular, generally tangential boss 24 having a longitudinal axis normal to the longitudinal axis of the head. The axes of the head and the boss are sufficiently far apart that the two opposite ends 26 thereof are accessible from the exterior of the head, but sufficiently close together that the bore 28 of the boss 24 is communicated to groove 20 of the bore 22 of the head intermediate the ends 26 of the boss. The intersection of the groove 20 and bore 28 is shown (FIGS. 2A, 2B and 2C) as being a single, wide slot 30.

The groove 20 receives a shoulder ring 32 which is shown being constituted by a plurality of arcuate segments 34, 36, 38, 40, arranged to form an annulus. Links 42 secured by link pins 44 hinge the adjacent ends of the segments 34 and 36 together, the adjacent ends of the segments 36 and 38 together, and the adjacent ends of the segments 38 and 40 together. The links 42 are accommodated in recesses 46 in the radially outer, i.e., back surfaces of the segments 34, 36, 38 and 40.

The adjacent ends of the segments 34 and 40 are not hinged together; instead, these ends are provided with radially outwardly directed tangs 50 which project out through the slot 30 to be grasped and acted on by equipment 52 disposed within the bore 28 of the boss 24. (Ports for greasing this equipment are shown at 54.)

A rod-shaped stem 56 is coaxially received in the boss 24 throughbore 28, and preferably projects at least a short distance outwardly of each end of the throughbore. The stem 56 is shown provided with wrench receiving surface means 58 of non-circular transverse cross-sectional shape at each end thereof and two oppositely axially extending oppositely helically threaded portions 60, 62 intermediate the ends 58. In this sense, the stem 56 is like a turn-buckle bolt.

Each of the threaded portions 60, 62 threadably receives a retractor nut 64 having a generally cylindrical exterior surface broken by an axially extending keyway 66 and a sector-shaped groove 68 that terminates short of the inner end of each nut to provide a first stop surface 70.

Adjacent the outer end of each retractor nut 64 there is positioned a washer-like spring shoe 72. Normally, the flat front face 74 of each spring shoe abuts the flat rear face 75 of the respective retractor nut. As depicted, each spring shoe has a sector-shaped prong 76 which extends axially forwardly from the front face thereof so that the flat side 78 thereof may slide against the comparable flat side 80 of the groove 68 of the respective retractor nut. The prong 76 is axially shorter than the groove 68, so that when the faces 74, 75 abut, the stop surface 82 defined at the end of the prong 76 lies axially short of engagement with the stop surface 70 to define a gap 84 therebetween. The spring shoes have longitudinal keyways 86 comparable to those of the retractor nuts. The spring shoes have oversize longitudinal bores 88 which permit their respective free passage over the threaded portions 60, 62 of the stem 56.

Each spring shoe is backed by a coil spring 90, also freely coaxially received upon the stem 56. The springs 90 are normally relatively uncompressed. Axially inwardly the end regions 149 of the combined end cap and packing gland 98 receives packing 96, junk rings 94 and snap ring retainers 92. The gland 98 passes each outer end of the stem and is threadably secured in the two opposite outer end portions of the throughbore 28. The glands 98 include circumferential seals at 100. The outer ends of the glands are recessed at 102 to permit wrenching access to the surface means 58 at the two opposite ends of the stem 56. To protect these ends when no wrenching is to be done for a period, the recesses 102 are internally helically threaded to permit threaded installation of bull plugs 104.

When the parts shown exploded at the left in FIG. 1 are assembled into the bore 28, key pins 104 inserted in radially directed openings 106 in the boss 24 ride in the keyways, 66, 86 to prevent rotation of the retractor nuts and spring shoes.

The two tangs 50 of the segments 34, 40 ride in the two respective gaps 84 between the two pairs of stop surfaces 70, 82. As the stem 56 is rotated in one sense, the tangs 50 are engaged by the stop surfaces 70 and urged apart, thus expanding the shoulder ring from its FIG. 2A condition wherein it constricts the bore 22 of the head toward its FIG. 2B condition wherein the bore 22 is substantially fully open. As the stem 56 is rotated in the opposite sense, the tangs 50 are engaged by the stop surfaces 82 and urged toward one another, thus constracting the shoulder ring from its FIG. 2B condition toward its FIG. 2A condition.

Figure 2B:
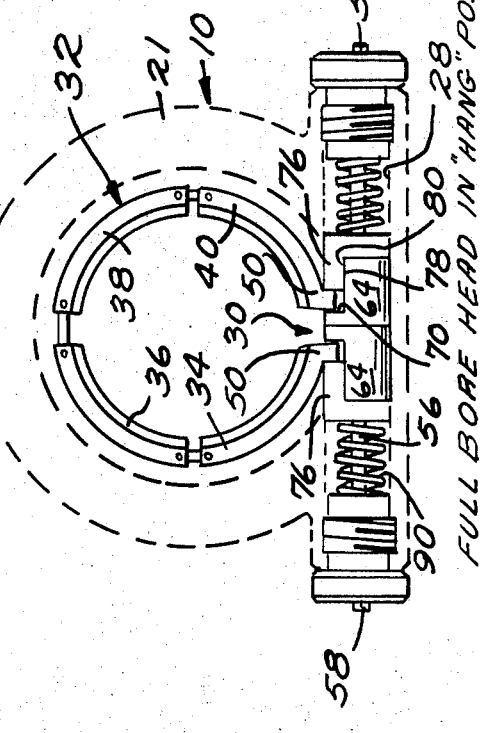
Figure 2C:
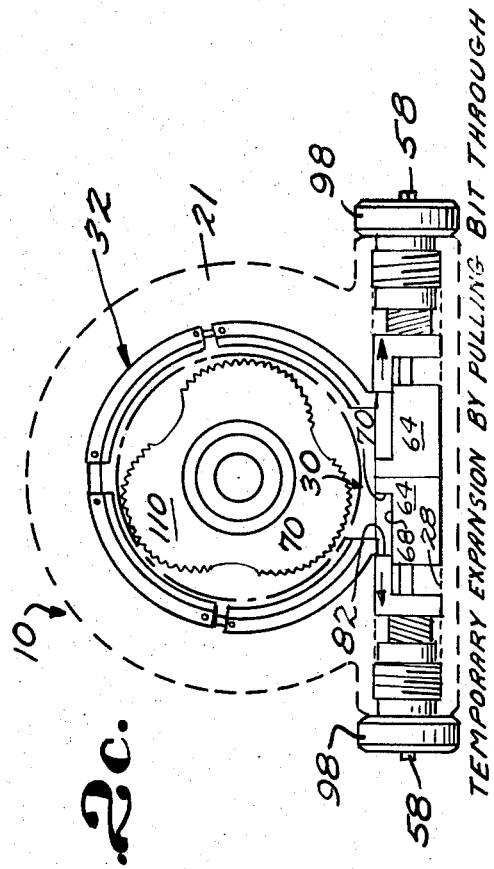
Figure 3:
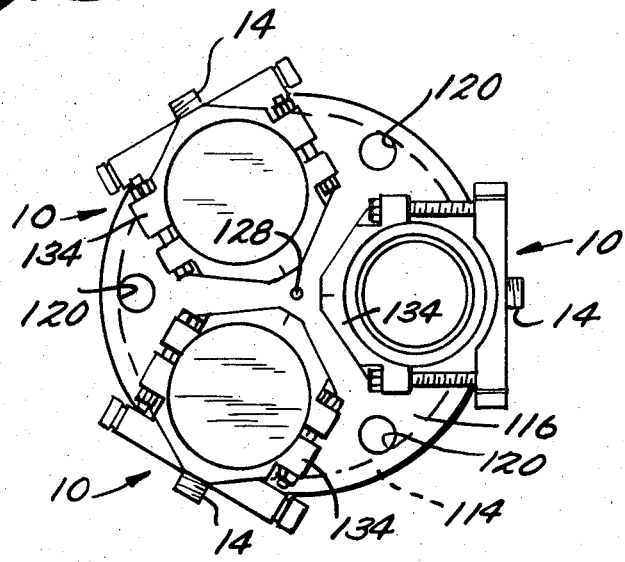
FIG. 3 is a top plan view of a platform leg shown at an early stage of the coordinate completion of three well using three casing heads provided in accordance with the present invention.

As depicted and as currently conceived of in its best mode, the stem 56 is designed to be manually rotated, e.g., using a stem crank-type socket wrench 108 (FIG. 1), but other means such as an air motor could be used, e.g., compare FIGS. 2 and 3 of the U.S. Pat. of Watts et al., 3,231,297, issued Jan. 25, 1966.

As illustrated in FIG. 2C, even when the shoulder ring is in the hang position of FIG. 2A, full bore equipment located down in the well, e.g., a drill bit 110, may be pulled up through the ring causing axially outward movement of the spring shoes as the tangs 50 press against the stop surfaces 82, temporarily overcoming the restorative force of the springs 90. Once the equipment has passed, the springs 90 recover and reconstruct the shoulder ring.

It should be noticed that the chamfer 112 on the lower outer corner of the ring segments, as a wedging surface, assists in the temporary expansion just described. The upper inner corner of the ring segments is squared off to prevent a similar expansion when equipment is supported upon the constricted shoulder ring. Further, the slip bowl-like shape of the ring receiving recess in the head requires the ring to rise if it is to significantly expand, this being highly unlikely to occur when support of an item of equipment is being transferred to the constricted ring.

Figure 4:
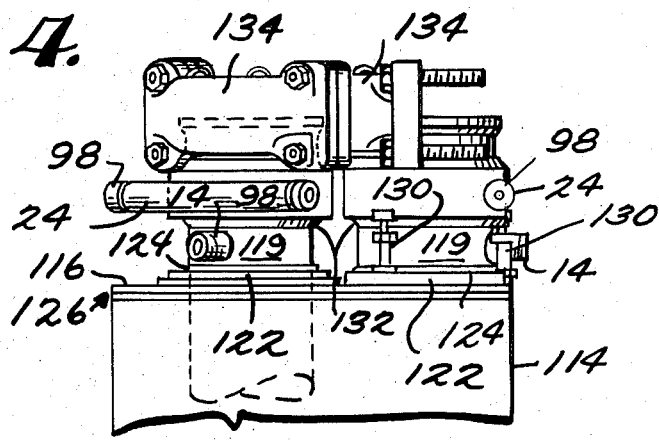
FIG. 4 is a side elevation view of the equipment depicted in FIG. 3.

In the typical completion shown beginning in FIGS. 3 and 4, a tubular leg 114 of an off-shore drilling platform has been provided at its upper end with a template 116 having three larger openings 118 set in a triangular pattern and three smaller openings 120 set in another triangular pattern angularly offset 60 degrees from the first. Weld rings 112 have been circumferentially welded upon the template 116 peripherally of each opening 118; three outer casing strings 119 have been lowered into the wells through the openings 118 and peripherally welded at 124 near their upper ends to the weld rings 122. The template 116 has been circumferentially welded at 126 on the upper end of the platform leg. The weld rings 122 act as hangers for the casings 119 whose upper ends are cut off flat a distance above the template. Cement has been pumped through the openings 120, e.g., using hoses, into the space within the leg around the outsides of three casings 119 and permitted to set to anchor the casings in place. Then three outlet nipples 14 have been installed, one on each casing 119, above the template. Each nipple 14 radiates from the casing on which it is installed and radiates with respect to the template and platform leg. A bench mark 128 may be placed centrally on the template to facilitate alignment of other equipment during installation. Next, three heads 10 have been placed on the three respective casing 119 upper ends, levelled using means such as jack screws 130 and circumferentially welded in place as at 132. As shown, the heads 10 are oriented prior to welding so that their bosses 24 lie radially outermost with respect to the bench mark 128, i.e., on axes normal to radians from the bench mark.

At the stage depicted in FIGS. 3 and 4, Grayloc (T.M. Gray Tool Company) minimum clearance clamps 134 have been installed on the clamp-receiving flanges 18 of the left-most two of the heads 10. These clamps have been closed about circular disk-shaped protector plates.

The third clamp 134 is shown partially installed on the head 10 of the right-most well, the well which will be further completed first.

Figure 5:
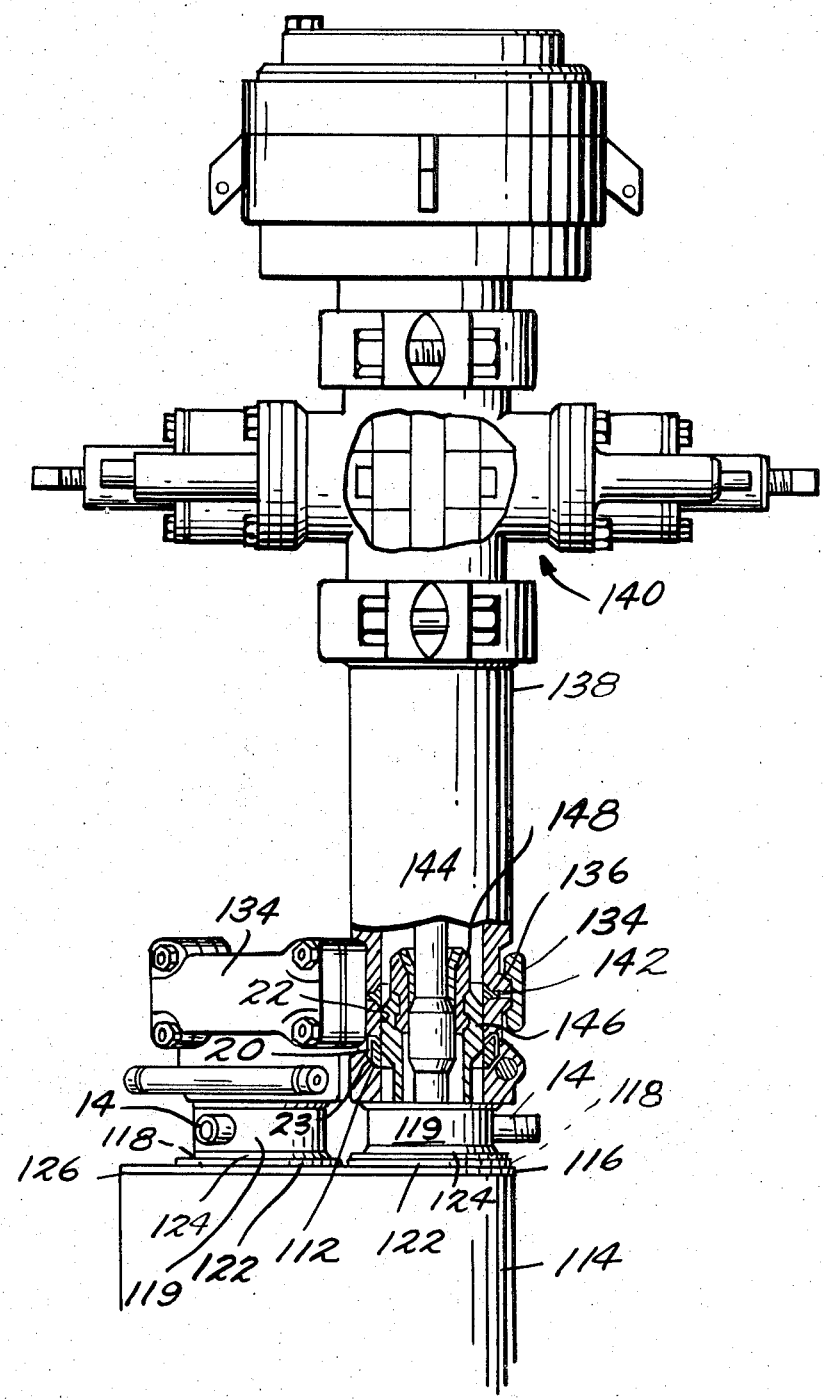
FIG. 5 is a side elevation view of the wells of FIGS. 3 and 4 at a somewhat later stage of completion, one well completion being partly sectioned longitudinally to expose otherwise hidden structure.

Turning to FIG. 5, depicting a somewhat later stage than FIGS. 3 and 4, the third clamp 134 has been secured about the clamping flange 136 of the spacing spool 138 of a blowout preventer stack 140 having the same bore as the head 10 bore 22. A Grayloc (T.M. Gray Tool Company) seal ring 142 is shown sealing between the sectioned head 10 and the spool 138. After the shoulder ring of this head has been constricted and a conventional test of the blowout preventer stack conducted with a test hanger (not shown) lowered into place on the shoulder ring on a string of drill pipe, the test hanger has been withdrawn, the head throughbore reopened to full bore, a drill bit (not shown) has been lowered into the well through the full bore on a string of drill pipe 144 for further drilling of the well. The drill pipe 144 is shown having carried a wear sleeve 146 into the head 10 on a retriever 148. The shoulder ring of the head 10 has been reconstricted when the wear sleeve has reached the level shown in order to support the wear sleeve in the head. (See the U.S. Pat. of Phipps et al., 3,489,214, issued Jan. 13, 1970, for further information regarding the installation, function and retrieval of wear sleeves.)

Suffice it to say here that the one well shown being further drilled and completed can be fully completed to any stage, including the landing of a casing hanger supporting a casing string, installation of a tubing head on the casing head and the installation of production tubing and valving and that the other two wells shown may be drilled and completed in succession.

While the design of shoulder ring 32 depicted is preferred, other designs are possible. For instance, guides for maintaining coaxiality of the ring during expansion and contraction could be provided along the lines suggested in the U.S. patent of Brown et al., 3,661,409, issued May 9, 1972. In this regard, it should be made means joining respective two of said adjacent ends, could be changed without departing from the principles of the invention, e.g., refer again to the U.S. Pat. of Pierce, Jr., 3,405,956, issued Oct. 15, 1968. To reemphasize, the invention need not be used in a confined space plural well completion, although that is where its advantages now seem to be most welcome.

The bosses 24 have been shown as permitting access to the stem 56 from both ends, a matter worth noting when one is to be working in a confined space and may not be sure ahead of time which end may be most accessible. Quite clearly, this redundancy is not essential to the successful employment of the invention in the broadest aspect thereof.

It should now be apparent that the full bore casing head as described hereinabove possesses each of the attributes set forth in the specification under the heading "Summary of the Invention" hereinbefore. Because the full bore casing head of the invention can be modified to some extent without departing from the principles of the invention as they have been outlined and explained in this specification, the present invention should be understood as encompassing all such modifications as are within the spirit and scope of the following claims.

What is claimed is:

1. A well casing head comprising:
   a tubular casing head body having a vertical throughbore;
   means defining a radially inwardly opening circumferentially extending groove in said throughbore intermediate the ends thereof;
   a boss formed on the casing head body and having means defining a generally horizontal bore therein extending generally tangentially of the throughbore of the head, said bore slot; an intersection with the throughbore thereby defining a slot:
   an expansible/contractile shoulder ring received in said groove and being generally radially movable between an expanded condition wherein the ring lies substantially wholly in the groove and does not substantially constrict the throughbore of the casing head body, and a constracted condition wherein the ring extends from the groove partially into the throughbore of the casing head body to partially constrict said throughbore so equipment such as a casing hanger may be supported thereon; said ring being split so as to have two adjacent ends;
   tang means extending from each of said adjacent ends toward said slot;
   ring expanding and contracting means disposed in the bore of said boss in contact with said tang means and being movable axially of the bore of said boss in both axial senses to expand and contract the ring; and
   means in said bore for moving the expanding and contracting means in both axial senses.

2. The well casing head of claim 1 wherein the ring is constituted by a plurality of arcuate ring segments arranged into a ring by having adjacent ends; and hinge means joining respective two of said adjacent ends, but for the two adjacent ends provided with said tang means.

3. The well casing head of claim 2 wherein the ring expanding and contracting means includes, for each tang means, means presenting two opposed stop surfaces spaced axially from one another along the bore of said boss, each tang means being confined between a respective two of said opposed stop surfaces; and wherein the means for moving the expanding and contracting means includes means for moving at least one respective two of said opposed stop surfaces in both said axial senses with the respective tang means confined therebetween.

4. The well casing head of claim 3 wherein the ring further includes a generally circumferential chamfer on the axially lower, radially inner quadrant thereof, disposed to be contacted by equipment larger in width than the internal diameter of the ring when the ring is in said contracted condition and that equipment is being raised as if to draw it through the ring from below;
   each respective two of said opposed stop surfaces being provided on two individual respective bodies; means resiliently urging these bodies toward one another to minimize the stop surface-to-stop surface dimension of said gap yet permitting these two opposed stop surfaces to be moved one away from the other in response to contact of the equipment being raised, to allow the ring to temporarily expand to pass the aforesaid equipment therethrough.

5. The well casing head of claim 4 wherein the two individual respective bodies are constituted by an internally threaded nut having a portion removed from the exterior thereof to provide a recess extending from one end of the nut to a point short of the opposite end thereof to define one of said stop surfaces at said point, and an annular washer-like spring shoe having an axially directed pin projecting from one face thereof, said pin being so dimensioned and positioned that when said one face of the spring shoe abuts said one end of said nut, the pin lies in said recess of said nut with the outer end thereof short of and opposing said one of said stop surfaces to constitute the other of said stop surfaces;

a stem coaxially received in the bore of said boss and having an externally threaded portion, said nut being threadably received on said externally threaded portion, the annular washer-like spring shoe having a central opening of a sufficiently large size as to pass said stem; key means on said nut, spring shoe and boss for preventing rotation of said nut and spring shoe with respect to said boss; a coil spring constituting said resilient means and being received on the stem with one end urging the spring shoe toward the nut; retainer means securing the opposite end of the coil spring against axial movement in the sense away from the spring shoe; annular journalling and sealing means between the stem and the boss, the stem having a portion extending therethrough for accessibility from exteriorly of the casing head; and a non-circular transverse cross-sectional wrenching surface means defined on said extending portion of the stem, said spring being relatively uncompressed when the ring is in said contracted condition thereof and being relatively compressed when the ring is in said expanded condition thereof.

6. The well casing head of claim 1 wherein the ring expanding and contracting means includes, for each tang means, means presenting two opposed stop surfaces spaced axially from one another along the bore of said boss, each tang means being confined between a respective two of said opposed stop surfaces; and wherein the means for moving the expanding and contracting means includes means for moving at least one respective two of said opposed stop surfaces in both said axial senses with the respective tang means confined therebetween.

7. The well casing head of claim 6 wherein the ring further includes a generally circumferential chamfer on the axially lower, radially inner quadrant thereof, disposed to be contacted by equipment larger in width than the internal diameter of the ring when the ring is in said contracted condition and that equipment is being raised as if to draw it through the ring from below;

each respective two of said opposed stop surfaces being provided on two individual respective bodies; means resiliently urging these bodies toward one another to minimize the stop surface-to-stop surface dimension of said gap yet permitting these two opposed stop surfaces to be moved one away from the other in response to contact of the equipment being raised, to allow the ring to temporarily expand to pass the aforesaid equipment therethrough.

8. The well casing head of claim 7 wherein the two individual respective bodies are constituted by an internally threaded nut having a portion removed from the exterior thereof to provide a recess extending from one end of the nut to a point short of the opposite end thereof to define one of said stop surfaces at said point, and an annular washer-like spring shoe having an axially directed pin projecting from one face thereof, said pin being so dimensioned and positioned that when said one face of the spring shoe abuts said one end of said nut, the pin lies in said recess of said nut with the outer end thereof short of and opposing said one of said stop surfaces to constitute the other of said stop surfaces;

a stem coaxially received in the bore of said boss and having an externally threaded portion, said nut being threadably received on said externally threaded portion, the annular washer-like spring shoe having a central opening of a sufficiently large size as to pass said stem; key means on said nut, spring shoe and boss for preventing rotation of said nut and spring shoe with respect to said boss; a coil spring constituting said resilient means and being received on the stem with one end urging the spring shoe toward the nut; retainer means securing the opposite end of the coil spring against axial movement in the sense away from the spring shoe; annular journalling and sealing means between the stem and the boss, the stem having a portion extending therethrough for accessibility from exteriorly of the casing head; and a non-circular transverse cross-sectional wrenching surface means defined on said extending portion of the stem, said spring being relatively uncompressed when the ring is in said contracted condition thereof and being relatively compressed when the ring is in said expanded condition thereof.

9. The well casing head of claim 1 wherein the ring expanding and contracting means includes, for each tang means, means presenting two opposed stop surfaces spaced axially from one another along the bore of said boss, each tang means being confined between a respective two of said opposed stop surfaces; and wherein the means for moving the expanding and contracting means includes means for coordinately moving the two respective twos of said opposed stop surfaces axially toward one another and away from one another with the respective tang means confined between each respective two of said opposed stop surfaces.

10. The well casing head of claim 9 wherein the ring further includes a generally circumferential chamfer on the axially lower, radially inner quadrant thereof, disposed to be contacted by equipment larger in width than the internal diameter of the ring when the ring is in said contracted condition and that equipment is being raised as if to draw it through the ring from below;

each respective two of said opposed stop surfaces being provided on two individual respective bodies; means resiliently urging these bodies toward one another to minimize the stop surface-to-stop surface dimension of said gap yet permitting these two opposed stop surfaces to be moved one away from the other in response to contact of the equipment being raised, to allow the ring to temporarily expand to pass the aforesaid equipment therethrough.

11. The well casing head of claim 10 wherein each two individual respective bodies are constituted by an internally threaded nut having a portion removed from the exterior thereof to provide a recess extending from one end of the nut to a point short of the opposite end thereof to define one of said stop surfaces thereof at said point, and an annular washer-like spring shoe having an axially directed pin projecting from one face thereof, said pin being so dimensioned and positioned that when said one face of the spring shoe abuts said one end of said nut, the pin lies in said recess of said nut with the outer end thereof short of and opposing said one of said stop surfaces to constitute the other of said stop surfaces thereof;

a stem coaxially received in the bore of said boss and having two axially spaced externally threaded portions of opposite helical threading sense, each nut being threadably received on a one of said respective externally threaded portions, each annular washerlike spring shoe having a central opening of a sufficiently large size as to pass said stem; key means on each nut, spring shoe and on the boss for preventing rotation of said nuts and spring shoes with respect to said boss; two coil springs constituting said resilient means, and being received on the stem with one end of each urging the respective spring shoe toward the respective nut; retainer means securing the opposite end of each coil spring against axial movement in the sense away from the respective spring shoe; annular journalling and sealing means between the stem and the boss, the stem having at least one portion extending therethrough for accessibility from exteriorly of the casing head; and a non-circular transverse cross-sectional wrenching surface means defined on at least one of said extending portions of the stem, said springs being relatively uncompressed when the ring is in said contracted condition thereof and being relatively compressed when the ring is in said expanded condition thereof.

12. The well casing head of claim 11 wherein the boss is tubular and said stem includes said wrenching surface means at both ends thereof.

* * * * *